United States Patent
Jiang et al.

(10) Patent No.: US 12,418,029 B2
(45) Date of Patent: Sep. 16, 2025

(54) ANODE MATERIAL AND ELECTROCHEMICAL DEVICE INCLUDING THE SAME, AND ELECTRONIC DEVICE

(71) Applicant: Ningde Amperex Technology Limited, Fujian (CN)

(72) Inventors: Daoyi Jiang, Fujian (CN); Zhihuan Chen, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 626 days.

(21) Appl. No.: 17/708,279

(22) Filed: Mar. 30, 2022

(65) Prior Publication Data

US 2022/0328840 A1 Oct. 13, 2022

Related U.S. Application Data

(63) Continuation of application No. PCT/CN2021/084484, filed on Mar. 31, 2021.

(51) Int. Cl.
*H01M 4/62* (2006.01)
*H01M 4/36* (2006.01)
*H01M 4/48* (2010.01)
*H01M 4/02* (2006.01)

(52) U.S. Cl.
CPC ........... *H01M 4/625* (2013.01); *H01M 4/366* (2013.01); *H01M 4/48* (2013.01); *H01M 2004/021* (2013.01); *H01M 2004/027* (2013.01)

(58) Field of Classification Search
CPC ..... H01M 2004/021; H01M 2004/027; H01M 4/131; H01M 4/366; H01M 4/48; H01M 4/483; H01M 4/62; H01M 4/622; H01M 4/625; Y02E 60/10
See application file for complete search history.

(56) References Cited

U.S. PATENT DOCUMENTS

| | | | |
|---|---|---|---|
| 2011/0097627 A1* | 4/2011 | Watanabe | H01M 4/38 252/182.1 |
| 2014/0302395 A1* | 10/2014 | Fukuoka | H01M 4/0421 252/502 |
| 2017/0040599 A1* | 2/2017 | Kamo | H01M 4/622 |
| 2017/0294648 A1 | 10/2017 | Burshtain et al. | |

FOREIGN PATENT DOCUMENTS

| CN | 103280560 A | 9/2013 |
|---|---|---|
| CN | 102299338 B | 6/2014 |
| CN | 106282967 A | 1/2017 |

(Continued)

OTHER PUBLICATIONS

International Search Report mailed Dec. 30, 2021, corresponding to International Application No. PCT/ CN2021/084484; 4 pages.

(Continued)

*Primary Examiner* — Victoria H Lynch
(74) *Attorney, Agent, or Firm* — Maier & Maier, PLLC (57) ABSTRACT

An anode material, including a matrix material, and the matrix material comprises carbon-doped silicon monoxide, and a content of the carbon ranges from 0.5% to 10% based on a total mass of the carbon and silicon monoxide. The anode material can significantly improve the cycle performance of an electrochemical device at room temperature and high temperature.

15 Claims, 2 Drawing Sheets

(56) References Cited

FOREIGN PATENT DOCUMENTS

| CN | 108306009 A | 7/2018 |
|---|---|---|
| CN | 109119627 A | 1/2019 |
| CN | 106282967 B | 3/2019 |
| CN | 110911636 A | 3/2020 |
| CN | 111384380 A | 7/2020 |
| CN | 111525121 A | 8/2020 |
| CN | 112271277 A | 1/2021 |
| IN | 107431196 A | 12/2017 |
| JP | 2011096455 A | 5/2011 |
| JP | 2013235685 A | 11/2013 |
| KR | 1020140090599 A | 7/2014 |
| KR | 10-2018-0115974 A | 10/2018 |
| WO | 2013054476 A1 | 4/2013 |

OTHER PUBLICATIONS

Office Action issued on Sep. 1, 2022, in corresponding Chinese Application No. 202180001809.4, 15 pages.
Office Action issued on Mar. 31, 2023, in corresponding Chinese Application No. 202180001809.4, 8 pages.
Office Action issued on Aug. 31, 2023, in corresponding Chinese Application No. 202180001809.4, 12 pages.
Office Action issued on Jun. 27, 2023, in corresponding Japanese Application No. 2021-540896, 8 pages.
Office Action issued on May 23, 2023, in corresponding Korean Application No. 10-2021-7022080, 10 pages.
Office Action issued on Oct. 19, 2023, in corresponding Korean Application No. 10-2021-7022080, 10 pages.
Office Action issued on Sep. 11, 2023, in corresponding Korean Application No. 10-2021-7022080, 7 pages.
Search Report issued on Sep. 12, 2022, in corresponding European Application No. 21809905.9, 11 pages.
Wu et al., "High-Performance SiO/C as Anode Materials for Lithium-Ion Batteries Using Commercial SiO and Glucose as Raw Materials", Rare Metals, Springer Nature, Jun. 9, 2020, vol. 40, No. 5, 8 pages.

* cited by examiner

ANODE MATERIAL AND ELECTROCHEMICAL DEVICE INCLUDING THE SAME, AND ELECTRONIC DEVICE

CROSS-REFERENCE TO RELATED APPLICATIONS

This present application is a bypass continuation application of PCT application PCT/CN2021/084484, filed on Mar. 31, 2021, the disclosure of which is hereby incorporated by reference in its entirety.

TECHNICAL FIELD

The present application relates to the field of energy storage technology, and in particular to an anode material and an electrochemical device including the same, and an electronic device, and in particular to an anode material suitable for lithium ion batteries.

BACKGROUND

Because of the advantage such as high energy density, high working voltage, light weight, low self-discharge rate, long cycle life, no memory effect, and environmental friendliness, electrochemical devices (for example, lithium ion batteries) have been widely used in intelligent products (including electronic products such as mobile phones, notebook computers, cameras), electric vehicles, power tools, drones, advanced weaponry and equipment, and large-scale energy storage and other fields and industries.

The silicon-based anode material has high capacity, which is considered to be the most promising lithium ion anode material in the future. However, due to the poor conductivity of silicon, the silicon-based anode material is prone to form an unstable solid electrolyte interface (SEI) film during charge and discharge cycles, and prone to occur volume expansion, which severely hinders the application thereof.

In view of this, it is indeed necessary to provide an anode material that is conducive to improving the cycle performance of an electrochemical device at room temperature and high temperature.

SUMMARY

In order to attempt at solving at least one problem existing in the related field at least to some extent, embodiments of the present application provides an anode material and an electrochemical device including the same, and an electronic device.

In one embodiment, the present application provides an anode material, comprising a matrix material, wherein the matrix material comprises carbon and silicon monoxide, and a content of the carbon ranges from 0.5% to 10% based on the total mass of carbon, silicon and oxygen.

According to the embodiment of the present application, the carbon is doped in the silicon monoxide, and in any area of the matrix material, a content of the carbon ranges from 0.5% to 10% based on the total mass of carbon, silicon, and oxygen.

According to the embodiment of the present application, the matrix material has an average particle size that ranges from 0.5 μm to 30 μm.

According to the embodiment of the present application, the matrix material has a specific surface area that is less than or equal to 10 m$^2$/g.

According to the embodiment of the present application, the anode material further comprises a coating layer formed on at least a part of a surface of the matrix material, and the coating layer includes at least one selected from the group consisting of carbon, oxide, and polymer.

According to the embodiment of the present application, the anode material satisfies at least one characteristic selected from the group consisting of: (a) the coating layer contains carbon, and the carbon in the coating layer includes amorphous carbon; (b) the coating layer contains carbon, and the weight ratio of the carbon content in the coating layer to the carbon content in the matrix material ranges from 0.5 to 5; (c) the coating layer contains carbon, and the carbon content in the coating layer ranges from 0.05% to 10% based on the weight of the anode material; (d) the oxide has a formula MeOy, Me includes at least one selected from the group consisting of Al, Si, Ti, Mn, V, Cr, Co, and Zr, a value of 2*y is a valence of Me, and a content of the Me ranges from 0.05% to 5% based on the weight of the anode material; and (e) a thickness of the coating layer ranges from 0.5 nm to 100 nm.

According to the embodiment of the present application, the polymer includes at least one selected from the group consisting of polyvinylidene fluoride, carboxymethyl cellulose, carboxymethylcellulose sodium, polyvinyl pyrrolidone, polyacrylic acid, styrene butadiene rubber, polyacrylamide, polyimide and polyamideimide.

According to the embodiment of the present application, in a X-ray diffraction pattern of the anode material, an intensity of the highest characteristic peak of 2θ in a range of 28.4±0.1 is $I_1$, an intensity of the highest characteristic peak of 2θ in the range of 22.0±0.1 is $I_2$, and $I_1/I_2 \leq 10$.

In another embodiment, the present application provides an electrochemical device, comprising the anode material as mentioned above.

In still another embodiment, the present application provides an electronic device, comprising the electrochemical device as mentioned above.

The additional aspects and advantages of the embodiments of the present application will be partially described, shown, or explained through the implementation of the embodiments of the present application in the subsequent description.

BRIEF DESCRIPTION OF THE DRAWINGS

Hereinafter, the drawings required for describing embodiments of the present application or the prior art will be briefly described so as to describe the embodiments of the present application. Obviously, the drawings in the following description are only a part of embodiments of the present application. For those skilled in the art, on the premise without any creative work, drawings of other embodiments can still be obtained according to the structures illustrated in these drawings.

DETAILED DESCRIPTION

Embodiments of the present application will be described in detail hereinafter. In the full text of the description of the present application, the same or similar components, and components with the same or similar functions are denoted by similar reference numerals. The embodiments related to the drawings described herein are illustrative, diagrammatic, and are used to provide a basic understanding of the present application. The embodiments of the present application should not be explained as limitations on the present application.

Unless clearly indicated otherwise, the following terms used herein have the meanings indicated hereinafter.

The term "about" is used to describe and illustrate small changes. When being used in conjunction with an event or situation, the term can refer to an example in which the event or situation occurs precisely, and an example in which the event or situation occurs extremely similarly. For example, when being used in conjunction with a value, the term can refer to a range of variation less than or equal to ±10% of the value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, in some cases, amounts, ratios, and other values are presented in range format herein. It should be understood that such a range format is used for convenience and brevity, and should be understood flexibly, the range format not only includes the values explicitly designated as range limits, but also encompasses all individual values or sub-ranges within the range, which is the equivalent of clearly specifying each value and sub-range.

In concrete implementation approaches and claims, a list of items connected by the term "at least one selected from the group consisting of" can mean any combination of the listed items. For example, if items A and B are listed, the phrase "at least one selected from the group consisting of A and B" means only A; only B; or A and B. In another example, if items A, B, and C are listed, the phrase "at least one selected from the group consisting of A, B, and C" means only A; only B; only C; A and B (excluding C); A and C (excluding B); B and C (excluding A); or all of A, B, and C. Item A can contain a single component or multiple components. Item B can contain a single component or multiple components. Item C can contain a single component or multiple components.

The silicon-based anode material has a specific capacity as high as 1000 mAh/g to 4200 mAh/g, and is considered to be the most promising anode material for lithium ion batteries in the future. However, due to the poor conductivity (a conductivity greater than $10^8$ Ω·cm) of silicon, the solid electrolyte interface (SEI) film formed by the silicon-based anode material during charging and discharging is unstable and prone to volume expansion (as high as 300%), so that it is impossible to meet the long-cycle and low-expansion requirements required by consumer batteries.

Means of improving the performance of silicon anode materials include design of porous materials, reduction in material sizes, oxide coating, polymer coating, carbon coating, and improvement of matrix materials. Design of porous materials and reduction in material sizes cannot avoid the occurrence of side reactions and uncontrollable growth of SEI films during a cycle, which limits the cycle stability of the silicon anode material. Silicon anode material coated by oxide or polymer silicon still has a poor conductivity (a conductivity is greater than $10^5$ Ω·cm) and a high electrochemical impedance, and the coating layer is easily damaged during the process of intercalation/deintercalation of lithium, causing an adverse effect on the cycle life of lithium ion batteries. Carbon coating can provide excellent conductivity (a conductivity is less than 0.1 Ω·cm), but a decarburization phenomenon easily occurs during processing a pole piece, and due to the expansion, contraction and cracking of silicon during a cycle, the carbon coating layer is easily peeled off from the silicon-based anode material, resulting in a shortened cycle life of lithium ion batteries. The matrix material of the silicon anode material mainly includes silicon oxycarbide material and silicon monoxide material. Silicon oxycarbide materials prepared by using polysiloxane precursors include structures such as $SiOC_3$, $SiO_2C_3$, $SiO_3C_3$ or $SiO_4$, and the specific capacity is low (for example, 1000 mAh/g). Due to limitations of the raw material and structure of the precursors, the carbon content in the formed silicon oxycarbide structure will be greater than 10%, resulting in a significant reduction in voltage platform. Even if being improved by doping or coating, silicon oxycarbide materials still have a higher voltage platform and a lower energy density. Disproportionation can control the distribution of silicon and oxygen in silicon monoxide. Although silicon and oxygen can be evenly distributed in the matrix, the lithium silicate formed after lithium intercalation is unstable, leading to insufficient cycle performance of silicon monoxide. Therefore, the cycle performance of lithium ion batteries cannot be effectively improved.

In order to solve the above problems, the present application uses silicon monoxide doped with a specific content of carbon as a matrix material to prepare an anode material, thereby improving the cycle performance of the electrochemical device at room temperature and high temperature. Specifically, the present application provides an anode material, including a matrix material, wherein the matrix material includes carbon and silicon monoxide, and a content of the carbon ranges from 0.5% to 10% based on the total mass of carbon, silicon and oxygen. In some embodiments, the content of the carbon ranges from 0.8% to 8% based on the total mass of carbon, silicon, and oxygen. In some embodiments, the content of the carbon ranges from 1% to 6% based on the total mass of carbon, silicon, and oxygen. In some embodiments, the content of the carbon ranges from 2% to 5% based on the total mass of carbon, silicon, and oxygen. In some embodiments, the content of the carbon ranges from 3% to 4% based on the total mass of carbon, silicon, and oxygen. In some embodiments, the content of the carbon is 0.5%, 1%, 2%, 3%, 4%, 5%, 6%, 7%, 8%, 9%, 10% or within a range composed by any of the above values, based on the total mass of carbon, silicon, and oxygen.

Doping a specific content of atomic-level carbon inside the silicon oxide can form Si—C and O—C bonds inside the matrix material, so that it is possible to alleviate or inhibit the splitting of the Si—O bond and the reforming of a Si-rich area during a cycle, further alleviating the problem of excessive expansion stress in the Si-rich area, which significantly improves the cycle performance of the electrochemical device at room temperature and high temperature.

In some embodiments, the carbon is doped in the silicon monoxide, in any area of the matrix material, the content of the carbon ranges from 0.5% to 10% based on the total mass of carbon, silicon and oxygen. In some embodiments, in any area of the matrix material, the content of the carbon ranges from 0.8% to 8% based on the total mass of carbon, silicon and oxygen. In some embodiments, in any area of the matrix material, the content of the carbon ranges from 1% to 6% based on the total mass of carbon, silicon and oxygen. In some embodiments, in any area of the matrix material, the content of the carbon ranges from 2% to 5% based on the total mass of carbon, silicon and oxygen. In some embodiments, in any area of the matrix material, the content of the carbon ranges from 3% to 4% based on the total mass of carbon, silicon and oxygen. In some embodiments, in any area of the matrix material, the content of the carbon is 0.5%, 1%, 2%, 3%, 4%, 5%, 6%, 7%, 8%, 9%, 10% or within a range composed by any of the above values, based on the total mass of carbon, silicon and oxygen.

In some embodiments, the matrix material has an average particle size that ranges from 0.5 µm to 30 µm. In some embodiments, the matrix material has an average particle size that ranges from 1 µm to 25 µm. In some embodiments, the matrix material has an average particle size that ranges from 5 µm to 20 µm. In some embodiments, the matrix material has an average particle size that ranges from 10 µm to 15 µm. In some embodiments, the matrix material has an average particle size that is 0.5 µm, 1 µm, 3 µm, 5 µm, 8 µm, 10 µm, 13 µm, 15 µm, 18 µm, 20 µm, 23 µm, 25 µm, 28 µm, 30 µm, or within a range composed by any of the above values. When the matrix material has an average particle size within the above range, it is conducive to further improving the cycle performance of the electrochemical device at room temperature and high temperature.

In some embodiments, the matrix material has a specific surface area that is less than or equal to 10 $m^2/g$. In some embodiments, the matrix material has a specific surface area that is less than or equal to 9 $m^2/g$. In some embodiments, the matrix material has a specific surface area that is less than or equal to 8 $m^2/g$. In some embodiments, the matrix material has a specific surface area that is less than or equal to 7 $m^2/g$. In some embodiments, the matrix material has a specific surface area that is less than or equal to 6 $m^2/g$. In some embodiments, the matrix material has a specific surface area that is less than or equal to 5 $m^2/g$. In some embodiments, the matrix material has a specific surface area that is less than or equal to 4 $m^2/g$. In some embodiments, the matrix material has a specific surface area that is less than or equal to 3 $m^2/g$. In some embodiments, the matrix material has a specific surface area that is less than or equal to 2 $m^2/g$. In some embodiments, the matrix material has a specific surface area that is less than or equal to 1 $m^2/g$. When the matrix material has a specific surface area within the above range, it is conducive to further improving the cycle performance of the electrochemical device at room temperature and high temperature.

In some embodiments, the anode material further includes a coating layer formed on at least a part of a surface of the matrix material, and the coating layer includes at least one selected from the group consisting of carbon, oxide, and polymer.

In some embodiments, the coating layer contains carbon.

In some embodiments, the carbon in the coating layer includes amorphous carbon.

In some embodiments, the weight ratio of the carbon content in the coating layer to the carbon content in the matrix material ranges from 0.5 to 5. In some embodiments, the weight ratio of the carbon content in the coating layer to the carbon content in the matrix material ranges from 0.8 to 4. In some embodiments, the weight ratio of the carbon content in the coating layer to the carbon content in the matrix material ranges from 1 to 3. In some embodiments, the weight ratio of the carbon content in the coating layer to the carbon content in the matrix material is 0.5, 0.8, 1, 1.5, 2, 2.5, 3, 3.5, 4, 4.5, 5, or within a range composed by any of the above values. When the weight ratio of the carbon content in the coating layer to the carbon content in the matrix material is within the above range, it is conducive to further improving the cycle performance of the electrochemical device at room temperature and high temperature.

In some embodiments, the carbon content in the coating layer ranges from 0.05% to 10% based on the weight of the anode material. In some embodiments, the carbon content in the coating layer ranges from 0.1% to 8% based on the weight of the anode material. In some embodiments, the carbon content in the coating layer ranges from 0.5% to 5% based on the weight of the anode material. In some embodiments, the carbon content in the coating layer ranges from 0.8% to 3% based on the weight of the anode material. In some embodiments, the carbon content in the coating layer ranges from 1% to 2% based on the weight of the anode material. In some embodiments, the carbon content in the coating layer is 0.005%, 0.1%, 0.5%, 1%, 2%, 3%, 4%, 5%, 6%, 7%, 8%, 9%, 10% or within a range composed by any of the above values, based on the weight of the anode material. When the carbon content in the coating layer is within the above range, it is conducive to further improving the cycle performance of the electrochemical device at room temperature and high temperature.

In some embodiments, the coating layer contains oxide.

In some embodiments, the oxide has a formula MeOy, Me includes at least one selected from the group consisting of Al, Si, Ti, Mn, V, Cr, Co, and Zr, a value of 2*y is a valence of Me.

In some embodiments, a content of the Me ranges from 0.05% to 5% based on the weight of the anode material. In some embodiments, the content of the Me ranges from 0.1% to 4% based on the weight of the anode material. In some embodiments, the content of the Me ranges from 0.5% to 3% based on the weight of the anode material. In some embodiments, the content of the Me ranges from 1% to 2% based on the weight of the anode material. In some embodiments, the content of the Me is 0.05%, 0.1%, 0.5%, 1%, 2%, 3%, 4%, 5% or within a range composed by any of the above values, based on the weight of the anode material. When the content of the Me in the oxide is within the above range, it is conducive to further improving the cycle performance of the electrochemical device at room temperature and high temperature.

In some embodiments, the coating layer contains polymer.

In some embodiments, the polymer includes at least one selected from the group consisting of polyvinylidene fluoride, carboxymethyl cellulose, carboxymethylcellulose sodium, polyvinyl pyrrolidone, polyacrylic acid, styrene butadiene rubber, polyacrylamide, polyimide and polyamideimide.

In some embodiments, the coating layer has a thickness ranges from 0.5 nm to 100 nm. In some embodiments, the coating layer has a thickness ranges from 1 nm to 80 nm. In some embodiments, the coating layer has a thickness ranges from 5 nm to 60 nm. In some embodiments, the coating layer has a thickness ranges from 10 nm to 50 nm. In some embodiments, the coating layer has a thickness ranges from 20 nm to 30 nm. In some embodiments, the coating layer has a thickness of 0.5 nm, 1 nm, 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, or within a range composed by any of the above values. When the coating layer has a thickness within the above range, it is conducive to further improving the cycle performance of the electrochemical device at room temperature and high temperature.

In some embodiments, in a X-ray diffraction pattern of the anode material, an intensity of the highest characteristic peak of 2θ in a range of 28.4±0.1 is $I_1$, an intensity of the highest characteristic peak of 2θ in the range of 22.0±0.1 is $I_2$, and $I_1/I_2 \leqslant 10$. The value of $I_1/I_2$ can reflect the degree of disproportionation of the anode material. The smaller the value of $I_1/I_2$, the larger the size of the silicon nanocrystals inside the anode material. When $I_1/I_2$ is within the above range, it is conducive to further improving the cycle performance of the electrochemical device at room temperature and high temperature.

Anode

The anode includes an anode current collector and an anode material layer arranged on the anode current collector. The anode material layer includes the anode material according to the present application.

In some embodiments, the anode material layer includes an anode binder. In some embodiments, the anode binder includes, but is not limited to: polyvinyl alcohol, carboxymethyl cellulose, hydroxypropyl cellulose, diacetyl cellulose, polyvinyl chloride, carboxylated polyvinyl chloride, polyvinyl fluoride, polymers containing ethyleneoxy, polyvinyl pyrrolidone, polyurethane, polytetrafluoroethylene, poly(1, 1-difluoroethylene), polyethylene, polypropylene, styrene butadiene rubber, acrylic acid (acrylate) modified styrene butadiene rubber, phenolic epoxy resin and nylon.

In some embodiments, the anode material layer includes an anode conductive material. In some embodiments, the anode conductive material includes, but is not limited to: natural graphite, artificial graphite, carbon black, acetylene black, ketjen black, carbon fiber, metal powder, metal fiber, copper, nickel, aluminum, silver or polyphenylene derivatives.

In some embodiments, the anode current collector includes, but is not limited to: copper foil, nickel foil, stainless steel foil, titanium foil, nickel foam, copper foam or polymer substrate coated with conductive metal.

In some embodiments, the anode can be obtained by the following method: mixing an anode material, a conductive material, and a binder in a solvent to prepare slurry of the anode material, and coating the slurry of the anode material on the anode current collector.

In some embodiments, the solvent can include, but is not limited to: N-Methyl pyrrolidone.

Cathode

The cathode includes a cathode current collector and a cathode material arranged on the cathode current collector. The specific types of the cathode material are not limited to concrete restrictions, and can be selected according to requirements.

In some embodiments, the cathode material include a cathode material capable of absorbing and releasing lithium (Li). Examples of the cathode material capable of absorbing and releasing lithium (Li) can include lithium cobaltate, lithium nickel manganese cobalt oxide, lithium nickel aluminate cobalt oxide, lithium manganate, lithium manganese iron phosphate, lithium vanadium phosphate, lithium vanadyl phosphate, ferrous lithium phosphate, lithium titanate and lithium-rich manganese-based materials.

Specifically, the chemical formula of lithium cobaltate may be as Chemical Formula 1:

Chemical Formula 1 wherein, M1 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), Zinc (Zn), molybdenum (Mo), tin (Sn), calcium (Ca), strontium (Sr), tungsten (W), yttrium (Y), lanthanum (La), zirconium (Zr) and silicon (Si), and values of x, a, b, and c are within the following ranges: $0.8 \leqslant x \leqslant 1.2$, $0.8 \leqslant a \leqslant 1$, $0 \leqslant b \leqslant 0.2$, $-0.1 \leqslant c \leqslant 0.2$.

Lithium nickel manganese cobalt oxide or lithium nickel aluminate cobalt oxide may be as Chemical Formula 2:

Chemical Formula 2 wherein, M2 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr) and silicon (Si), and values of y, d, e, and f are within the following ranges: $0.8 \leqslant y \leqslant 1.2$, $0.3 \leqslant d \leqslant 0.98$, $0.02 \leqslant e \leqslant 0.7$, $-0.1 \leqslant f \leqslant 0.2$.

Lithium manganate may be as Chemical Formula 3:

Chemical Formula 3 wherein, M3 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), Zinc (Zn), molybdenum (Mo), tin (Sn), calcium (Ca), strontium (Sr) and tungsten (W), and values of z, g, and h are within the following ranges: $0.8 \leqslant z \leqslant 1.2$, $0 \leqslant g < 1.0$ and $-0.2 \leqslant h \leqslant 0.2$.

In some embodiments, the weight of the cathode material layer is 1.5 to 15 times the weight of the anode material layer. In some embodiments, the weight of the cathode material layer is 3 to 10 times the weight of the anode material layer. In some embodiments, the weight of the cathode material layer is 5 to 8 times the weight of the anode material layer. In some embodiments, the weight of the cathode material layer is 1.5, 2, 3, 4, 5, 6, 7, 8, 9, 10, 11, 12, 13, 14, or 15 times the weight of the anode material layer.

In some embodiments, the cathode material layer have a coating on the surface, or may be mixed with another compound having a coating. The coating may include at least one coating element compound selected from the group consisting of oxides of coating elements, hydroxides of coating elements, oxyhydroxides of coating elements, oxycarbonates of coating elements, and hydroxycarbonates of coating elements. The compound used for the coating may be amorphous or crystalline. The coating element contained in the coating may include Mg, Al, Co, K, Na, Ca, Si, Ti, V, Sn, Ge, Ga, B, As, Zr, F, or a mixture thereof. The coating can be applied by any method as long as the method does not cause an adverse effect on the performance of the cathode material. For example, the method may include any coating method such as spraying and dipping, which is well known to those skilled in the art.

In some embodiments, the cathode material layer includes a binder, and optionally further includes a cathode conductive material.

The binder can improve the binding between particles of the cathode material, and also improve the binding of the cathode material and the current collector. Non-limiting examples of the binders include polyvinyl alcohol, hydroxypropyl cellulose, diacetyl cellulose, polyvinyl chloride, carboxylated polyvinyl chloride, polyvinyl fluoride, polymers containing ethyleneoxy, polyvinyl pyrrolidone, polyurethane, polytetrafluoroethylene, poly(1,1-difluoroethylene), polyethylene, polypropylene, styrene butadiene rubber, acrylated styrene butadiene rubber, phenolic epoxy resin, nylon, and the like.

The cathode material layer includes a cathode conductive material, thereby imparting conductivity to the electrode. The cathode conductive material may include any conductive material as long as no chemical change is caused. Non-limiting examples of the cathode conductive materials include carbon-based materials (e.g., natural graphite, artificial graphite, carbon black, acetylene black, ketjen black, carbon fiber), metal-based materials (e.g., metal powder, metal fiber, etc., including copper, nickel, aluminum, silver, etc.), conductive polymers (e.g., polyphenylene derivatives) and mixtures thereof.

The cathode current collector used in the electrochemical device according to the present application may be aluminum (Al), but is not limited thereto.

Electrolyte Solution

The electrolyte solution that can be used in the embodiment of the present application may be an electrolyte solution known in the prior art.

The electrolytes that can be used in the electrolyte solution of the examples of the present application includes, but are not limited to: inorganic lithium salts, such as $LiClO_4$, $LiAsF_6$, $LiPF_6$, $LiBF_4$, $LiSbF_6$, $LiSO_3F$, $LiN(FSO_2)_2$, etc.; fluorine-containing organic lithium salts, such as $LiCF_3SO_3$, $LiN(FSO_2)(CF_3SO_2)$, $LiN(CF_3SO_2)_2$, $LiN(C_2F_5SO_2)_2$, cyclic 1,3-hexafluoropropane disulfonimide lithium, cyclic 1,2-lithium tetrafluoroethane disulfonimide lithium, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, $LiBF_2(C_2F_5SO_2)_2$; lithium salts containing dicarboxylic acid complexes, such as lithium bis(oxalato)borate, lithium difluoro(oxalate)borate, lithium tris(oxalato) phosphate, lithium difluoro bis(oxalato) phosphate, lithium tetrafluoro(oxalato) phosphate, and the like. In addition, the above-mentioned electrolytes may be used singly, or two or more thereof may be used simultaneously. In some embodiments, the electrolyte includes a combination of $LiPF_6$ and $LiBF_4$. In some embodiments, the electrolyte includes a combination of an inorganic lithium salt such as $LiPF_6$ or $LiBF_4$ and a fluorine-containing organic lithium salt such as $LiCF_3SO_3$, $LiN(CF_3SO_2)_2$, $LiN(C_2F_5SO_2)_2$. In some embodiments, the electrolyte includes $LiPF_6$.

In some embodiments, the electrolyte has a concentration within the range of 0.8-3 mol/L, for example, within the range of 0.8-2.5 mol/L, within the range of 0.8-2 mol/L, within the range of 1-2 mol/L, for another example, of 1 mol/L, 1.15 mol/L, 1.2 mol/L, 1.5 mol/L, 2 mol/L or 2.5 mol/L.

Solvents that can be used in the electrolyte solution of the embodiments of the present application include, but are not limited to, cyclic carbonates, chainlike carbonates, cyclic carboxylic ester, chainlike carboxylic esters, cyclic ethers, and chainlike ethers, phosphorus-containing organic solvents, sulfur-containing organic solvents and fluorine-containing aromatic solvents.

In some embodiments, cyclic carbonates include, but are not limited to, ethylene carbonate (EC), propylene carbonate (PC), and butylene carbonate.

In some embodiments, cyclic carbonates has 3-6 carbon atoms.

In some embodiments, chainlike carbonates include, but are not limited to: chainlike carbonates such as dimethyl carbonate, ethyl methyl carbonate, diethyl carbonate (DEC), methyl n-propyl carbonate, ethyl n-propyl carbonate and di-n-propyl carbonate; chainlike carbonates substituted by fluorine, for example, bis(fluoromethyl) carbonate, bis(difluoromethyl) carbonate, bis(trifluoromethyl) carbonate, bis(2-fluoroethyl) carbonate, bis(2,2-difluoroethyl) carbonate, bis(2,2,2-trifluoroethyl) carbonate, 2-fluoroethyl methyl carbonate, 2,2-difluoroethyl methyl carbonate and 2,2,2-trifluoroethyl methyl carbonate.

In some embodiments, cyclic carboxylic esters include, but are not limited to: γ-butyrolactone and γ-valerolactone. In some embodiments, a part of hydrogen atoms of cyclic carboxylic esters may be replaced by fluorine.

In some embodiments, chainlike carboxylic esters include, but are not limited to: methyl acetate, ethyl acetate, n-propyl acetate, isopropyl acetate, butyl acetate, sec-Butyl acetate, isobutyl acetate, tert-Butyl acetate, methyl propionate, ethyl propionate, n-propyl propionate, isopropyl propionate, methyl butyrate, butyric acid ethyl ester, n-propyl butyrate, methyl isobutyrate, ethyl isobutyrate, methyl pentanoate, ethyl n-valerate, methyl pivalate and ethyl trimethylacetate. In some embodiments, a part of hydrogen atoms of chainlike carboxylic esters may be replaced by fluorine. In some embodiments, fluorine-substituted chainlike carboxylic esters include, but are not limited to: methyl trifluoroacetate, ethyl trifluoroacetate, propyl trifluoroacetate, butyl trifluoroacetate, and 2,2,2-trifluoroethyl trifluoroacetate.

In some embodiments, cyclic ethers include, but are not limited to: tetrahydrofuran, 2-methyltetrahydrofuran, 1,3-dioxolane, 2-methyl 1,3-dioxolane, 4-methyl-1,3-dioxolane, 1,3-dioxane, 1,4-dioxane and dimethoxy propane.

In some embodiments, chainlike ethers include, but are not limited to: dimethoxymethane, 1,1-dimethoxyethane, 1,2-dimethoxyethane, diethoxymethane, 1,1-diethoxyethane, 1,2-diethoxyethane, ethoxymethoxy methane, 1,1-ethoxy-methoxyethane and 1,2-ethoxy-methoxyethane.

In some embodiments, the phosphorus-containing organic solvents include, but are not limited to: trimethyl phosphate, triethyl phosphate, ethyl dimethylphosphonate, methyl ethylenephosphonate, ethyl ethylenephosphonate, triphenyl phosphate, triphenyl phosphate, trimethyl phosphite, triethyl phosphite, triphenyl phosphite, tris(2,2,2-trifluoroethyl) phosphate and tris(2,2,3,3,3-pentafluoropropyl) phosphate.

In some embodiments, sulfur-containing organic solvents include, but are not limited to: sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and di-n-butyl sulphate. In some embodiments, a part of hydrogen atoms of sulfur-containing organic solvents may be replaced by fluorine.

In some embodiments, fluorine-containing aromatic solvents include, but are not limited to: fluorobenzene, difluorobenzene, trifluorobenzene, tetrafluorobenzene, pentafluorobenzene, hexafluorobenzene, and trifluoromethylbenzene.

In some embodiments, the solvents used in the electrolyte solution of the present application includes one or more as mentioned above. In some embodiments, the solvents used in the electrolyte solution of the present application includes cyclic carbonates, chainlike carbonates, cyclic carboxylic esters, chainlike carboxylic esters, or combinations thereof. In some embodiments, the solvents used in the electrolyte solution of the present application includes an organic solvent selected from the group consisting of the following material composition: ethylene carbonate, propylene carbonate, diethyl carbonate, ethyl propionate, n-propyl propionate, n-propyl acetate, ethyl acetate and combinations thereof. In some embodiments, the solvents used in the electrolyte solution of the present application includes:

ethylene carbonate, propylene carbonate, diethyl carbonate, ethyl propionate, n-propyl propionate, γ-butyrolactone or a combination thereof.

Additives that can be used in the electrolyte solution of the embodiments of the present application include, but are not limited to, compounds with 2-3 cyano groups, cyclic carbonates containing carbon-carbon double bonds, compounds containing sulfur-oxygen double bonds, and lithium difluorophosphate.

In some embodiments, the compounds with 2-3 cyano groups may be at least one selected from the group consisting of: succinonitrile (SN), adiponitrile (ADN), ethylene glycol bis(propionitrile) ether (EDN), 1,3,5-pentyltricarbonitrile, 1,2,3-propanetricarbonitrile, 1,3,6-Hexanetricarbonitrile (HTCN), 1,2,6-Hexanetricarbonitrile, 1,2,3-tris(2-cyanoethoxy)propane (TCEP), and 1,2,4-tris(2-cyanoethoxy)butane.

In some embodiments, the cyclic carbonates containing carbon-carbon double bonds include, but are not limited to at least one selected from the group consisting of: vinylene carbonate, methyl vinylene carbonate, ethyl vinylene carbonate, vinyl vinyl ethylene carbonate, and 1,2-dimethyl vinylene carbonate.

In some embodiments, the compounds containing sulfur-oxygen double bonds include, but are not limited to at least one selected from the group consisting of: ethylene sulfate, 1,2-propanediol sulfate, 1,3-propanesultone, 1-fluoro-1,3-propanesultone, 2-fluoro-1,3-propanesultone, and 3-fluoro-1,3-propanesultone.

Separator

In some embodiments, a separator is provided between the cathode and the anode to prevent short circuits. The material and shape of the separator that can be used in the embodiments of the present application are not particularly limited, and can be any technology disclosed in the prior art. In some embodiments, the separator includes a polymer or an inorganic matter formed of a material that is stable to the electrolyte solution of the present application, or the like.

For example, the separator may include a substrate layer and a surface treatment layer. The substrate layer is a non-woven fabric, film or composite film with a porous structure, and the material of the substrate layer is at least one selected from the group consisting of polyethylene, polypropylene, polyethylene glycol terephthalate and polyimide. Specifically, a polypropylene porous film, a polyethylene porous film, a polypropylene non-woven fabric, a polyethylene non-woven fabric, or a polypropylene-polyethylene-polypropylene porous composite film can be selected. The porous structure can improve the heat resistance, oxidation resistance and electrolyte infiltration performance of the separator, and enhance the adhesion between the separator and the pole piece.

The surface treatment layer is arranged on at least one surface of the substrate layer, and the surface treatment layer may be a polymer layer or an inorganic matter layer, or a layer formed by a mixed polymer and an inorganic matter.

The inorganic layer includes inorganic particles and a binder. The inorganic particles are one selected from the group consisting of aluminum oxide, silicon oxide, magnesium oxide, titanium oxide, hafnium dioxide, tin oxide, ceric dioxide, nickel oxide, zinc oxide, calcium oxide, zirconium oxide, yttrium oxide, silicon carbide, boehmite, aluminium hydroxide, magnesium hydroxide, calcium hydroxide, and barium sulfate; or a combination thereof. The binder are one selected from the group consisting of polyvinylidene fluoride, copolymer of vinylidene fluoride and hexafluoropropylene, polyamide, polyacrylonitrile, polyacrylate, poly acrylic acid, polyacrylate salt, polyvinyl pyrrolidone, polyvinylether, polymethyl methacrylate, poly tetra fluoroethylene, and poly hexafluoropropylene; or a combination thereof.

The polymer layer contains a polymer. The material of the polymer is at least one selected from the group consisting of polyamide, polyacrylonitrile, acrylate polymer, polyacrylic acid, polyacrylate salt, polyvinyl pyrrolidone, polyvinylether, polyvinylidene fluoride, and copolymer of vinylidene fluoride and hexafluoropropylene.

Electrochemical Device

The present application further provides an electrochemical device, including a cathode, an electrolyte solution and an anode, wherein the cathode includes a cathode material layer and a cathode current collector, and the anode includes an anode material layer and an anode current collector. The anode material layer includes the anode material according to the present application.

The electrochemical device of the present application includes any device that undergoes an electrochemical reaction, and specific examples thereof include all kinds of primary batteries, secondary batteries, fuel cells, solar cells, or capacitors. In particular, the electrochemical device is a lithium secondary battery, including a lithium metal secondary battery, a lithium ion secondary battery, a lithium polymer secondary battery, or a lithium ion polymer secondary battery.

Electronic Device

The present application further provides an electronic device, including the electrochemical device according to the present application.

The use of the electrochemical device of the present application is not particularly limited, which can be used in any electronic device known in the prior art. In some embodiments, the electrochemical device of the present application can be used in, but not limited to, notebook computers, pen-input computers, mobile computers, e-book players, portable phones, portable fax machines, portable copiers, portable printers, and head-mounted stereo headsets, video recorders, LCD TVs, portable cleaners, portable CD players, mini discs, transceivers, electronic notebooks, calculators, memory cards, portable recorders, radios, backup power supplies, motors, automobiles, motorcycles, power assisted bicycles, bicycles, lighting equipment, toys, game consoles, clocks, power tools, flashlights, cameras, large household storage batteries and lithium ion capacitors, etc.

Hereinafter, a lithium ion battery is taken as an example and the preparation of a lithium ion battery is described in conjunction with specific examples. Those skilled in the art will understand that the preparation method described in the present application is only an example, and any other suitable preparation methods are within the scope of the present application.

EXAMPLES

The following describes performance evaluation of lithium ion batteries according to the examples and comparative examples of the present application.

1. Preparation of Lithium Ion Battery (1) Preparation of Anode

The anode material of each example and Comparative Example 1 was prepared by the following method: mixing uniformly silicon and silicon dioxide according to a weight ratio of 1:1.1 and loading the mixture into a vacuum deposition furnace, controlling the temperature at 1300° C. to 1350° C. and the vacuum degree ranging from 1 pa to 100 pa, injecting an appropriate amount of carbon source gas (methane, acetylene, ethylene, etc.) to obtain carbon-doped silicon monoxide (SiO) deposits, and after coarse crushing, fine crushing, crushing and classification, and demagnetization, obtaining carbon-doped silicon monoxide (having an average particle size that ranges from 3 μm to 8 μm).

According to the settings of each example, when necessary, an oxide layer (MeOy) is coated on the surface of carbon-doped silicon monoxide by the following method: forming a mixed solution by the carbon-doped silicon monoxide obtained above and an oxide precursor MeTn in the presence of an organic solvent (ethanol) and deionized water, and drying the mixed solution to obtain a powder, and then sintering the powder at about 250° C. to 900° C. for about 0.5 to 24 hours to obtain carbon-doped silicon monoxide coated with an oxide layer on the surface (wherein the value of 2*y is a valence of Me, and Me includes at least one selected from the group consisting of Al, Si, Ti, Mn, Cr, V, Co and Zr, T includes at least one selected from the group consisting of methoxy, ethoxy, isopropoxy and halogen, and n is 1, 2, 3 or 4).

According to the settings of each example, when necessary, a polymer layer is coated on the surface of carbon-doped silicon monoxide by the following method: dispersing the carbon-doped silicon monoxide obtained above and polymer in a solvent (ethanol, methanol, isopropanol or any mixed solvent thereof) at a high speed for 1 to 12 hours to obtain a suspension, and then removing the solvent in the suspension to obtain carbon-doped silicon monoxide coated with an oxide layer on the surface.

According to the settings of each example, when necessary, a carbon layer is coated on the surface of carbon-doped silicon monoxide by the following method: dissolving the carbon-doped silicon monoxide obtained above, a carbon material and a dispersant polymer (carboxymethylcellulose sodium or carboxymethylcellulose lithium) in a solvent (ethanol, methanol, isopropanol or any mixture solvent thereof), dispersing the mixture at high speed for 1 to 12 hours to obtain a suspension, removing the solvent in the suspension, and sintering the obtained solid at 250° C. to 900° C. for about 0.5 to 24 hours to obtain carbon-doped silicon monoxide coated with a carbon layer on the surface. When necessary, the carbon-doped silicon monoxide or carbon-doped silicon monoxide coated with a carbon layer obtained above was placed in a CVD vapor deposition furnace, a carbon source gas (methane, acetylene, ethylene or any mixture thereof) is loaded into, and the treatment was carried out at 600° C. to 950° C. to obtain carbon-doped silicon monoxide coated with an amorphous carbon layer on the surface.

For each example and Comparative Example 1: graphite (having a discharge cut-off voltage of 0.8V; and a specific capacity of 355 mAh/g) and the anode material were mixed, and adjusted to the specific capacity to 500 mAh/g to obtain the anode material of each example and Comparative Example 1.

For Comparative Example 2: polycarbosiloxane and asphalt were mixed in a weight ratio of 1:1, and then heated to 1100° C. at 3 degrees per minute, and subject to heat preservation for 4 hours. After crushing, pulverization, classification and other processes, the anode material of Comparative Example 2 was obtained.

The obtained anode material, a carbon nanotubes (CNT) of a conductive agent and lithium polyacrylate (PAALi) of a binder were mixed in a weight ratio of 95%:0.2%:4.8%, an appropriate amount of water was added, the mixture was kneaded at a solid content that ranges from about 55 wt % to 70 wt %, and then an appropriate amount of water was added to adjust the viscosity to about 4000 to 6000 Pa·s to obtain anode slurry. The prepared anode slurry was coated on a copper foil of the anode current collector, and subject to drying and cold pressing to obtain an anode.

(2) Preparation of Cathode

Lithium cobaltate, conductive carbon black and polyvinylidene fluoride in a weight ratio of 95%:2.5%:2.5% were mixed with N-methylpyrrolidone (NMP), and stirred uniformly to obtain cathode slurry. The prepared cathode slurry was coated on an aluminum foil of the cathode current collector, and subject to drying and cold pressing to obtain a cathode.

(3) Preparation of Electrolyte Solution

In a dry argon atmosphere, propylene carbonate (PC), ethylene carbonate (EC) and diethyl carbonate (DEC) were mixed in a weight ratio of about 1:1:1, and lithium salt $LiPF_6$ was added, wherein $LiPF_6$ had a concentration of 1.15 mol/L, and then fluoroethylene carbonate (FEC) at about 12.5 wt % was added and mixed uniformly to obtain an electrolyte solution.

(4) Preparation of Separator

PE porous polymer film was used as a separator.

(5) Preparation of Lithium Ion Battery

The cathode, the separator, and the anode were stacked in order, so that the separator is located between the cathode and the anode to play a role of isolation. A bare cell was obtained by winding. The bare cell was placed in an outer package, the electrolyte solution was injected, and encapsulation is performed. After forming, degassing, trimming and other technological processes, a lithium ion battery was obtained.

2. Test Methods (1) Method for Observing a Microscopic Morphology of the Matrix Material A scanning electron microscope (SEM) was used to observe the micro morphology (for example, agglomeration of particles) of a sample, so as to characterize the coating situation on the surface of the sample. The test instrument was OXFORD EDS (X-max-20 mm$^2$), and the acceleration voltage was 10 KV.

(2) Method for Testing a Relative Content of Carbon in the Matrix Material

The matrix material was sprinkled on a copper foil of a conductive adhesive, cut into sections, which is polished with a plasma polishing machine (Leica EM TIC 3X-Ion Beam Slope Cutter), and subsequently placed in a scanning electron microscope (SEM) to find the cut particles of the anode material. The particles of the above-mentioned anode material were cut along a vertical direction of a cross-section by using focused ion beam (FIB) to obtain a sheet containing the cross-section of the particles of the anode material, and then the ratio of carbon to the group of carbon, oxygen and silicon in a selected area was measured by using a transmission electron microscope (TEM) and an energy spectrometer (EDS).

(3) Method for Testing a Carbon Content

A sample was heated and burned in a high-frequency furnace under an oxygen-rich condition to oxidize the carbon into carbon dioxide. After treatment, the gas entered a corresponding absorption pool, absorbed corresponding infrared radiation, and then was converted into a corresponding signal by a detector. This signal was sampled by a computer and converted into a value proportional to the concentration of carbon dioxide after linear correction. Then, values of the whole analysis process was accumulated. After the analysis was finished, the accumulated value was divided by a weight value in the computer, and then multiplied by a correction coefficient, and the blank was deduct, and accordingly, a percentage of carbon in the sample can be obtained. The instrument used in the above test was a high-frequency infrared carbon and sulfur analyzer (Shanghai Dekai HCS-140).

The prepared uncoated carbon-doped silicon monoxide was used as a sample for measurement to obtain the carbon content in the matrix material. The coated carbon-doped silicon monoxide was used as a sample for measurement to obtain the total carbon content in the anode material. The carbon content in the coating layer is calculated by the following formula:

Carbon content in the coating layer=total carbon content in the anode material-carbon content in the matrix material.

(4) Method for Testing an Average Particle Size of the Matrix Material

About 0.02 g of a powder sample and about 20 ml of deionized water were added in a beaker, and then added with a few drops of 1% surfactant to make the powder completely dispersed in the water. The mixture was placed in a 120 W ultrasonic cleaner for 5 minutes, and a particle size distribution was tested by using MasterSizer 2000.

(5) Method for Testing a Specific Surface Area of the Matrix Material 1.5-3.5 g of a powder sample was weighed and loaded into a test sample tube of TriStar II 3020, degased at 200° C. for 120 minutes, and tested. At a constant temperature and low temperature, after measuring an adsorption amount of gas on a solid surface at different relative pressures, the adsorption amount of a sample monolayer was calculated based on Brunauer-Emmett-Teller adsorption theory and formula. The specific surface area of a sample was calculated by the following formula:

$$\frac{p}{w(P0-p)} = \frac{1}{WmC} + (c-1)/(WmC) \cdot P/P0$$

wherein,

W is mass of gas adsorbed by a sample under a relative pressure,

Wm is a saturated adsorption capacity of gas covered with a monolayer, (c−1)/(WmC) is a slope, 1/WmC is an intercept, and a total specific surface area=Wm*N*Acs/M, a specific surface area S=St/m, wherein m is mass of a sample, and Acs is an average area 16.2 $A^2$ occupied by each $N_2$ molecule.

(6) Method for Testing an Element Content

A sample powder was dissolved by microwave, and a clear liquid was obtained by filtration. After a constant volume, the content of metal or non-metal elements in the sample was tested by using an inductively coupled plasma optical emission spectrometer (ICP-OES).

(7) Method for Testing $I_1/I_2$ 1.0 g to 2.0 g of a sample was placed in a groove of a glass sample holder, and was compacted and ground with a glass sheet. Testing was carried out by using an X-ray diffractometer (Brook, D8) in accordance with JJS K 0131-1996 "General Principles of Diffraction and Analysis Method for X-ray", in which a test voltage was set to 40 kV, a current was 30 mA, a scanning angle range was 10-85°, a scanning step was 0.0167°, and a time set for each step was 0.24 seconds, so as to obtain a XRD diffraction pattern. From the pattern, an intensity $I_1$ of the highest characteristic peak of 2θ in a range of 28.4±0.1, and an intensity $I_2$ of the highest characteristic peak of 2θ in the range of 22.0±0.1 were obtained to calculate the value of $I_1/I_2$.

(8) Method for Testing a Specific Capacity and a First Coulombic Efficiency of the Anode Material The prepared anode material, conductive carbon black and polymer were added to deionized water in a weight ratio of about 80%:10%:10%, stirred to form a slurry, coated with a doctor blade to form a coating having a thickness of about 100 μm, and placed in a vacuum drying box and dried at about 85° C. for about 12 hours. In a dry environment, the mixture was cut into a disc having a diameter of about 1 cm by a punching machine. In a glove box, a metal lithium sheet was used as a counter electrode, a composite membrane of ceglard was selected as an isolator, and an electrolyte solution was added to assemble a button cell. The cell was subject to charge and discharge tests by LAND series battery test to test a specific capacity of the anode material. A first coulombic efficiency was calculated by the following formula, First coulombic efficiency=capacity at a discharge cut-off voltage of 2.0V/capacity at a charge cut-off voltage of 0.005V.

(9) Method for Testing the Number of Cycles

At a test temperature (25° C. or 45° C.), a lithium ion battery was charged to 4.4V at a constant current of 0.7 C, charged to 0.025 C at a constant voltage, and discharged to 3.0V at 0.5 C after standing for 5 minutes. The capacity obtained by this step was served as an initial capacity. Then, a cycle test was carried out with 0.7 C charge/0.5 C discharge, and a specific value of the capacity after each cycle and the initial capacity was calculated to obtain a capacity attenuation curve. The number of cycles at 25° C. until the capacity retention ratio is 85% is recorded as the number of cycles of the lithium ion battery at room temperature. The number of cycles at 45° C. until the capacity retention ratio is 85% is recorded as the number of cycles of the lithium ion battery at high temperature.

(10) Method for Testing a Cycle Expansion Rate

At a test temperature (25° C. or 45° C.), a thickness of a lithium ion battery at 50% state of charge (SOC) (half charge) was tested with a spiral micrometer. Using the same step as the "method for testing the number of cycles", the lithium ion battery was cycled 400 times to make the battery in a 100% SOC (full charge) state, and a thickness of the fully charged lithium ion battery was tested with a spiral micrometer. The ratio of the thickness of the fully charged lithium ion battery to the thickness of the half charged lithium ion battery is cycle expansion rate. The cycle expansion rate tested at 25° C. is the cycle expansion rate of a lithium ion battery at room temperature. The cycle expansion rate tested at 45° C. is the cycle expansion rate of a lithium ion battery at high temperature.

3. Test Results

Table 1 shows the influence of the carbon content, average particle size and specific surface area of the matrix material, and the $I_1/I_2$ of the anode material on the cycle performance of a lithium ion battery at room temperature and high temperature.

TABLE 1

|  | Carbon content in the matrix material | Average particle size μm | Specific surface area m²/g | $I_1/I_2$ | Specific capacity mAh/g | First coulombic efficiency | Number of cycles at room temperature | Cycle expansion rate at room temperature | Number of cycles at high temperature | Cycle expansion rate at high temperature |
|---|---|---|---|---|---|---|---|---|---|---|
| Example 1 | 0.5% | 5.2 | 2.1 | 0.78 | 1470 | 61.3% | 680 | 6.4% | 430 | 8.5% |
| Example 2 | 1.5% | 5.3 | 2.2 | 0.8 | 1420 | 57.5% | 750 | 6.6% | 450 | 8.7% |
| Example 3 | 3% | 5.2 | 3.6 | 0.75 | 1245 | 56.3% | 720 | 6.4% | 470 | 9.3% |
| Example 4 | 10% | 5.3 | 5.2 | 0.73 | 870 | 52.1% | 730 | 6.1% | 502 | 8.2% |
| Example 5 | 3% | 3.2 | 4.8 | 0.76 | 1236 | 57.7% | 710 | 6.5% | 480 | 9.4% |
| Example 6 | 3% | 8.5 | 3.2 | 0.75 | 1238 | 55.8% | 730 | 6.3% | 470 | 9.1% |
| Example 7 | 3% | 5.3 | 3.6 | 5.01 | 1215 | 57.3% | 710 | 6.7% | 430 | 9.4% |
| Example 8 | 3% | 5.3 | 3.5 | 11.03 | 1225 | 58.3% | 650 | 7.2% | 410 | 10.3% |
| Comparative Example 1 | 0.05% | 5.4 | 1.6 | 0.76 | 1460 | 61.2% | 520 | 7.5% | 350 | 10.4% |
| Comparative Example 2 | 35% | 5.4 | 1.6 | 0.76 | 650 | 49.8% | 530 | 5.4% | 360 | 10.1% |

As shown in Table 1, the carbon content in the matrix material of Comparative Example 1 is relatively low, and the numbers of cycles of the lithium ion battery at room temperature and high temperature are relatively low, and the cycle expansion rates thereof are relatively high. When the carbon content in the matrix material (relative to the total mass of carbon, silicon and oxygen) is in the range of 0.5% to 10% (Examples 1-8), the number of cycles of the lithium ion battery at room temperature and high temperature increases significantly and the cycle expansion rate is significantly reduced. Doping a small amount of carbon in the matrix material including silicon monoxide will reduce the specific capacity and the first coulombic efficiency of the anode material, but compared with the significant improvement of the cycle performance, this degree of reduction is acceptable in the application thereof.

Figure 1:
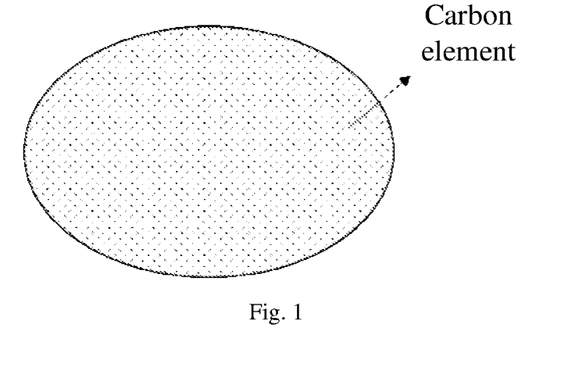
FIG. 1 shows a schematic diagram of carbon distribution in an anode material of Example 2.
Figure 2:
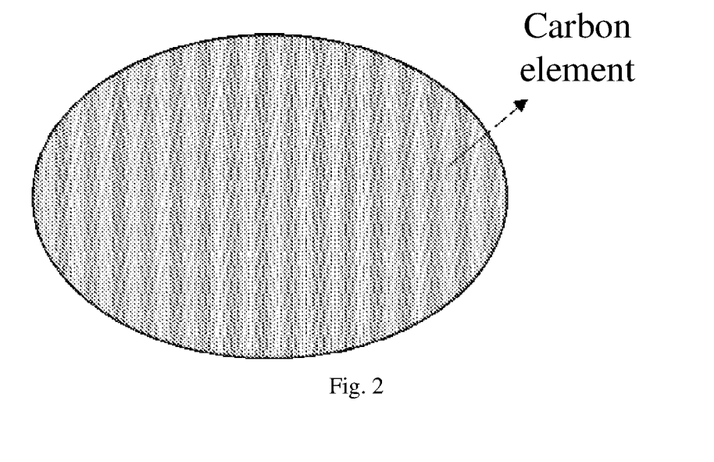
FIG. 2 shows a schematic diagram of carbon distribution in an anode material of Comparative Example 2.

FIG. 1 shows a schematic diagram of carbon distribution in an anode material of the present application by taking Example 2 as an example, wherein the carbon is substantially uniformly distributed, that is, in any area of the matrix material, the carbon content is substantially the same. FIG. 2 shows a schematic diagram of carbon distribution in an anode material of Comparative Example 2, wherein the matrix material of the anode material is a silicon oxycarbide material, and carbon is unevenly distributed in the matrix material.

When the matrix material has an average particle size that ranges from 0.5 μm to 30 μm, it is conducive to further increasing the number of cycles of the lithium ion battery at room temperature and high temperature and reducing the cycle expansion rate thereof.

When the matrix material has a specific surface area of less than or equal to 10 m²/g, it is conducive to further increasing the number of cycles of the lithium ion battery at room temperature and high temperature and reducing the cycle expansion rate thereof.

When the anode material has $I_1/I_2 \leq 10$, it is conducive to further increasing the number of cycles of the lithium ion battery at room temperature and high temperature and reducing the cycle expansion rate thereof.

Table 2 shows the influence of the carbon coating layer in an anode material on the cycle performance of the lithium ion battery at room temperature and high temperature. The difference between Examples 9-11 and Example 2 is only the parameters listed in Table 2.

TABLE 2

|  | Average particle size μm | Total carbon content | Weight ratio of the carbon content in the carbon coating layer to the carbon content in the matrix material | Weight ratio of the carbon content | Specific surface area m²/g | $I_1/I_2$ | Specific capacity mAh/g | First coulombic efficiency | Number of cycles at room temperature | Cycle expansion rate at room temperature | Number of cycles at high temperature | Cycle expansion rate at high temperature |
|---|---|---|---|---|---|---|---|---|---|---|---|---|
| Example 2 | 5.2 | 1.5% | / | / | 2.2 | 0.8 | 1420 | 57.5% | 750 | 6.6% | 450 | 8.7% |
| Example 9 | 5.4 | 2.3% | 1.77% | 0.53% | 2.4 | 2.4 | 1418 | 60.1% | 840 | 6.6% | 500 | 8.7% |
| Example 10 | 5.5 | 4.7% | 2.57% | 2.13% | 3.8 | 2.6 | 1399 | 58.3% | 890 | 6.4% | 540 | 8.5% |
| Example 11 | 5.3 | 8.2% | 3.73% | 4.47% | 4.4 | 2.5 | 1432 | 56.3% | 810 | 6.1% | 502 | 8.2% |

"/" means inexistence.

As shown in Table 2, the anode material of Examples 9-11 includes a carbon coating layer formed on a surface of the matrix material. When the carbon content in the coating layer of the matrix material ranges from 0.05% to 10%, and/or the weight ratio of the carbon content in the coating layer to the carbon content in the matrix material is 0.5 to 5, it is conducive to further improving the number of cycles of the lithium ion battery at room temperature and high temperature and reducing the cycle expansion rate thereof.

Table 3 shows the influence of an oxide coating layer in the anode material on the cycle performance of the lithium ion battery at room temperature and high temperature. The difference between Examples 12-14 and Example 2 is only the parameters listed in Table 3.

As shown in Table 4, the anode material of Examples 15-19 includes a polymer coating layer formed on a surface of the matrix material, which is conducive to further increasing the number of cycles of lithium ion batteries at room temperature and high temperature, and reducing the cycle expansion rate thereof. When the coating layer has a thickness that ranges from 0.5 nm to 100 nm, it is conducive to further increasing the number of cycles of the lithium ion battery at room temperature and high temperature and reducing the cycle expansion rate thereof.

References to "some embodiments", "a part of embodiments", "one embodiment", "another example", "examples", "specific examples" or "a part of examples"

TABLE 3

| | Average particle size μm | Oxide coating layer of MeOy | Content of Me element | Specific surface area m²/g | $I_1/I_2$ | Specific capacity mAh/g | First coulombic efficiency | Number of cycles at room temperature | Cycle expansion rate at room temperature | Number of cycles at high temperature | Cycle expansion rate at high temperature |
|---|---|---|---|---|---|---|---|---|---|---|---|
| Example 2 | 5.2 | / | / | 2.2 | 0.81 | 1420 | 57.5% | 750 | 6.6% | 450 | 8.7% |
| Example 12 | 5.3 | $Al_2O_3$ | 0.20% | 2.4 | 0.82 | 1398 | 56.5% | 832 | 6.5% | 510 | 8.6% |
| Example 13 | 5.5 | $TiO_2$ | 0.18% | 2.5 | 0.78 | 1402 | 58.3% | 880 | 6.2% | 550 | 8.4% |
| Example 14 | 5.4 | $ZnO_2$ | 0.23% | 2.4 | 0.78 | 1413 | 56.3% | 820 | 6.1% | 512 | 8.4% |

"/" means inexistence.

As shown in Table 3, the anode material of Examples 12-14 includes an oxide coating layer of MeOy formed on a surface of the matrix material. When the content of Me in the oxide layer ranges from 0.05% to 5%, it is conducive to further increasing the number of cycles of the lithium ion battery at room temperature and high temperature and reducing the cycle expansion rate thereof.

Table 4 shows the influence of the polymer coating layer and the thickness in the anode material on the cycle performance of the lithium ion battery at room temperature and high temperature. The difference between Examples 15-19 and Example 2 is only the parameters listed in Table 4.

throughout the whole description represent that at least one embodiment or example in the present application includes a specific feature, structure, material or characteristic described in the embodiment or example. Therefore, the descriptions appearing in various places throughout the whole description, for example: "in some embodiments", "in embodiments", "in one embodiment", "in another example", "in an example", "in a specific example" or "exemplified", which are not necessarily reference to the same embodiment or example in the present application. In addition, the specific features, structures, materials, or characteristics

TABLE 4

| | Average particle size μm | Polymer coating layer | Thickness of a coating layer nm | Specific surface area m²/g | $I_1/I_2$ | Specific capacity mAh/g | First coulombic efficiency | Number of cycles at room temperature | Cycle expansion rate at room temperature | Number of cycles at high temperature | Cycle expansion rate at high temperature |
|---|---|---|---|---|---|---|---|---|---|---|---|
| Example 2 | 5.2 | / | / | 2.2 | 0.81 | 1420 | 57.5% | 750 | 6.6% | 450 | 8.7% |
| Example 15 | 5.4 | Carboxymethylcellulose lithium | 100 | 2.0 | 0.79 | 1412 | 57.4% | 760 | 6.4% | 530 | 8.7% |
| Example 16 | 5.5 | Carboxymethylcellulose lithium | 250 | 1.9 | 0.83 | 1432 | 56.1% | 750 | 6.5% | 520 | 8.8% |
| Example 17 | 5.3 | Carboxymethylcellulose lithium | 50 | 2.1 | 0.82 | 1402 | 56.4% | 780 | 6.6% | 510 | 8.6% |
| Example 18 | 5.5 | Poly Acrylic acid Lithium | 46 | 1.9 | 0.78 | 1400 | 57.3% | 790 | 6.5% | 520 | 8.5% |
| Example 19 | 5.4 | Polyimide | 53 | 2.2 | 0.78 | 1389 | 54.3% | 790 | 6.4% | 530 | 8.7% |

"/" means inexistence.

herein can be combined in one or more embodiments or examples in any suitable manner.

Although illustrative embodiments have been demonstrated and described, those skilled in the art should understand that the above-mentioned embodiments cannot be explained as limit to the present application, and embodiments can be changed, replaced and modified without departing from the spirit, principle, and scope of the present application.

What is claimed is:

1. An anode material, comprising: a matrix material, wherein the matrix material comprises carbon and silicon monoxide, and a content of the carbon in the matrix material ranges from 0.5% to 10% based on a total mass of the carbon in the matrix material and the silicon monoxide;
   wherein the anode material further comprises a coating layer formed on at least a part of a surface of the matrix material, and the coating layer comprises an oxide;
   wherein the oxide has a formula MeOy, Me includes at least one selected from the group consisting of Al, Si, Ti, Mn, V, Cr, Co, and Zr; a value of 2×y is a valence of Me, and a content of the Me ranges from 0.05% to 5% based on a weight of the anode material;
   wherein the coating layer further comprises carbon; and
   wherein a content of the carbon in the coating layer ranges from 0.005% to 0.5% based on the weight of the anode material.

2. The anode material according to claim 1, wherein the carbon in the matrix material is doped in the silicon monoxide; and in any area of the matrix material, the content of the carbon in the matrix material ranges from 0.5% to 10% based on the total mass of carbon and silicon monoxide.

3. The anode material according to claim 1, wherein the matrix material has an average particle size ranging from 0.5 μm to 30 μm.

4. The anode material according to claim 1, wherein the matrix material has a specific surface area less than or equal to 10 m$^2$/g.

5. The anode material according to claim 1, wherein the coating layer further comprises a polymer.

6. The anode material according to claim 5, wherein the anode material satisfies at least one characteristic selected from the group consisting of:
   (a) the carbon in the coating layer includes amorphous carbon;
   (b) a weight ratio of the carbon content in the coating layer to the carbon content in the matrix material ranges from 0.5 to 5;
   (c) a thickness of the coating layer ranges from 0.5 nm to 100 nm.

7. The anode material according to claim 5, wherein the polymer includes at least one selected from the group consisting of polyvinylidene fluoride, carboxymethy cellulose, carboxymethylcellulose sodium, polyvinyl pyrrolidone, polyacrylic acid, styrene butadiene rubber, polyacrylamide, polyimide and polyamideimide.

8. The anode material according to claim 1, wherein in an X-ray diffraction pattern of the anode material, an intensity of the highest characteristic peak of 2θ in a range of 28.4±0.1 is I$_1$, and an intensity of the highest characteristic peak of 2θ in the range of 22.0±0.1 is I$_2$, and I$_1$/I$_2$≤10.

9. An electrochemical device, comprising an anode, wherein the anode comprises an anode material, the anode material comprises a matrix material, wherein the matrix material comprises carbon and silicon monoxide, and a content of the carbon in the matrix material ranges from 0.5% to 10% based on the total mass of the carbon in the matrix material and the silicon monoxide;
   wherein the anode material further comprises a coating layer formed on at least a part of a surface of the matrix material, and the coating layer comprises an oxide;
   wherein the oxide has a formula MeOy, Me includes at least one selected from the group consisting of Al, Si, Ti, Mn, V, Cr, Co, and Zr; a value of 2×y is a valence of Me, and a content of the Me ranges from 0.05% to 5% based on a weight of the anode material;
   wherein the coating layer further comprises carbon; and
   wherein a content of the carbon in the coating layer ranges from 0.005% to 0.5% based on the weight of the anode material.

10. The electrochemical device according to claim 9, wherein the carbon in the matrix material is doped in the silicon monoxide, and in any area of the matrix material, a content of the carbon in the matrix material ranges from 0.5% to 10% based on the total mass of carbon and silicon monoxide.

11. The electrochemical device according to claim 9, wherein the matrix material has an average particle size that ranges from 0.5 μm to 30 μm.

12. The electrochemical device according to claim 9, wherein the coating layer further comprises a polymer.

13. The electrochemical device according to claim 12, wherein the anode material satisfies at least one characteristic selected from the group consisting of:
   (a) the carbon in the coating layer includes amorphous carbon;
   (b) a weight ratio of the carbon content in the coating layer to the carbon content in the matrix material ranges from 0.5 to 5;
   (c) a thickness of the coating layer ranges from 0.5 nm to 100 nm.

14. The electrochemical device according to claim 9, wherein in a X-ray diffraction pattern of the anode material, an intensity of the highest characteristic peak of 2θ in a range of 28.4±0.1 is I$_1$, and an intensity of the highest characteristic peak of 2θ in the range of 22.0±0.1 is I$_2$, and I$_1$/I$_2$≤10.

15. An electronic device, comprising an electrochemical device claimed in claim 9.

* * * * *